No. 781,919. PATENTED FEB. 7, 1905.
C. W. STONE.
SYSTEM OF ELECTRICAL DISTRIBUTION.
APPLICATION FILED SEPT. 30, 1901.
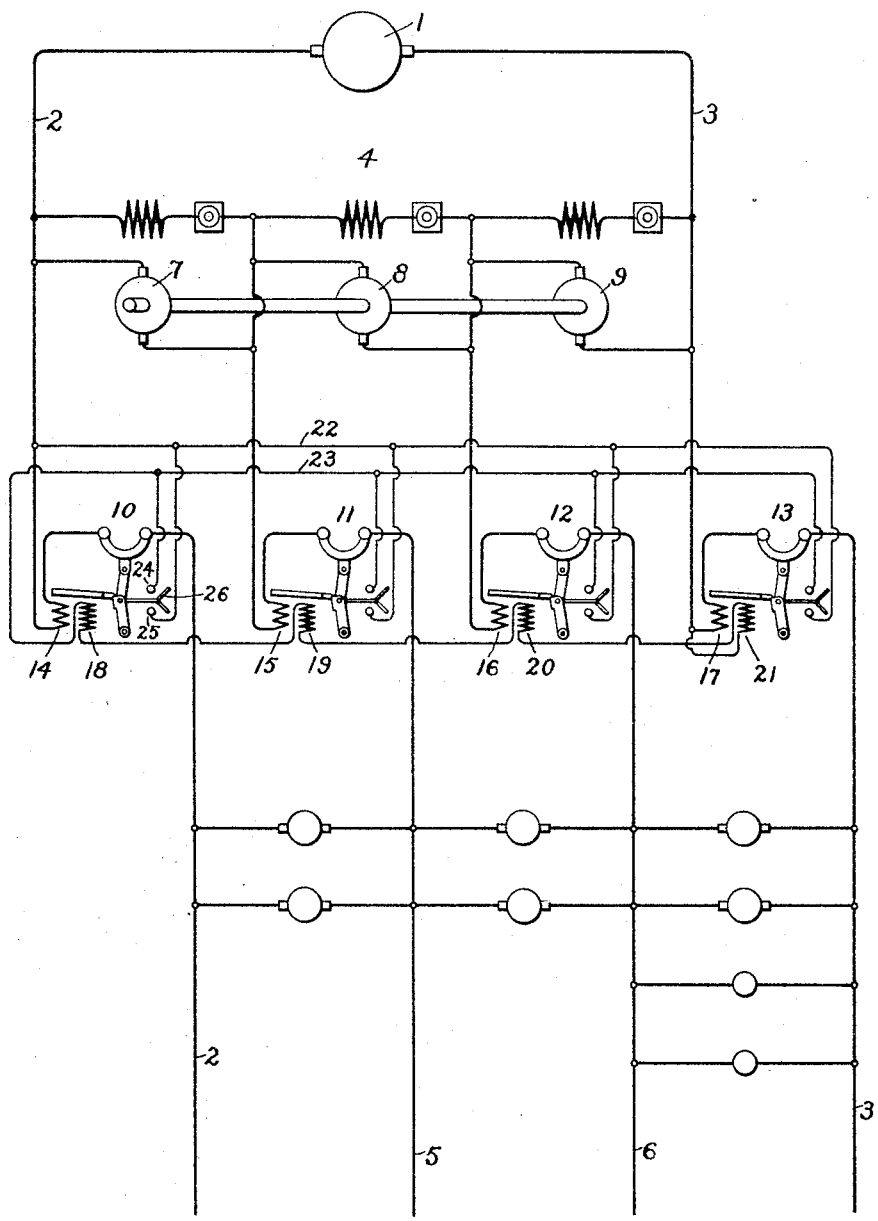
Witnesses.
John Ellis Glenn.
Benjamin B. Hill.
Inventor.
Charles W. Stone.
by Albert G. Davis
Atty.

No. 781,919.  
Patented February 7, 1905.

UNITED STATES PATENT OFFICE.

CHARLES W. STONE, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 781,919, dated February 7, 1905.

Application filed September 30, 1901. Serial No. 77,046.

*To all whom it may concern:*

Be it known that I, CHARLES W. STONE, a citizen of the United States, residing at Schenectady, county of Schenectady, State of New York, have invented certain new and useful Improvements in Systems of Electrical Distribution, of which the following is a specification.

My present invention relates to circuit-interrupting means for use more particularly in connection with multiple-conductor systems of electrical distribution; and it comprises certain improvements particularly pointed out in the appended claims and set forth in detail in the following description, which for clearness of understanding is to be taken in connection with the accompanying drawing, which represents in diagram one embodiment of my invention.

In the drawing, 1 represents conventionally any suitable source of current, from which extend distributing-mains 2 3. A set of balancing-machines 4, connected between these mains, provides means for dividing up the electromotive force between the mains and for impressing the resulting electromotive forces upon coöperating mains 5 6. The balancing-machines referred to are represented in the present instance as consisting of three machines, with their armature-shafts directly connected and their armatures 7, 8, and 9 in series with each other across the mains 2 3. The field-winding of each machine is connected in the usual manner in shunt to its armature and is provided, if desired, with a current-regulating device, such as a rheostat. From the connection between the armatures 7 8 and from the connection between the armatures 8 and 9 extend, respectively, the mains 5 and 6. By suitably exciting the fields of the machines the respective mains of the distribution system may be caused to divide up the voltage between the outside mains in any proportions desired. The manner of accomplishing this result is well understood in the art.

Each of the mains of the distribution system is provided with a circuit-breaker responsive to overload. These circuit-breakers are indicated at 10, 11, 12, and 13 and may be of any desired type known to the art. Each circuit-breaker, however, is provided with two tripping-coils, one a main tripping-coil in series with the main to which the circuit-breaker is connected and the other an auxiliary tripping-coil. The main tripping-coils are indicated, respectively, at 14, 15, 16, and 17 and the auxiliary tripping-coils at 18, 19, 20, and 21. Each circuit-breaker is also provided with a circuit-closing device which operates upon tripping of the circuit-breaker. The two terminals of each circuit-closing device are connected, respectively, to a pair of omnibus leads, which leads are connected across a suitable source of current. The omnibus leads above referred to are represented at 22 and 23. One of these leads—to wit, the lead 22—is connected to the outside main 2 of the distribution system, while the other lead, 23, is connected in series with all of the auxiliary tripping-coils 18, 19, 20, and 21 of the four circuit-breakers and then to the other outside main 3 of the distribution system.

The circuit-closing device forming part of each circuit-breaker may be arranged in any one of a large variety of ways. I have, however, for purposes of illustration represented one such arrangement in the drawings. This consists of two fixed contacts 24 25, with which coöperates a V-shaped bridging-contact 26, connected by a rod to the knee of the toggle-joint of the circuit-breaker. The arrangement thus described in connection with the circuit-breaker 10 may be duplicated in the remaining circuit-breakers, as shown.

When the current in any one of the mains of the distribution system exceeds an amount for which the circuit-breaker for that main may be set, the series tripping-coil of that circuit-breaker by reason of the excessive current then flowing therein opens the circuit of that main. By the tripping operation the circuit-closing device of the circuit-breaker closes the circuit between the omnibus leads 22 23, thereby energizing the auxiliary tripping-coils of all of the circuit-breakers, thereby causing all of the remaining circuit-breakers to trip, and so open-circuiting all of the remaining mains of the distribution system.

What I claim as new, and desire to secure by Letters Patent of the United States, is—

1. The combination of a multiple-conductor system of distribution, a circuit-breaker for each main conductor, a circuit-closing device for each circuit-breaker, omnibus leads adapted to be connected by any one of said circuit-closing devices, an auxiliary tripping-coil for each circuit-breaker, a connection between one of said omnibus leads and one terminal of a source of current, and a connection from the other omnibus lead through all of said auxiliary tripping-coils to the other terminal of said source of current.

2. The combination of a multiple-conductor system of electrical distribution, a plurality of circuit-breakers, each for a conductor of said system, and a tripping-circuit for all the circuit-breakers energized by the tripping of one of said circuit-breakers.

3. The combination of a source of current, mains extending therefrom, a set of balancing-machines connected between said mains, other mains extending from connections between said balancing-machines, a circuit-breaker for each main, an auxiliary tripping-coil for each circuit-breaker, and means operative upon the tripping of any one circuit-breaker for energizing the auxiliary tripping-coils of all of the circuit-breakers.

4. The combination of a multiple-conductor distribution system, a circuit-breaker for each conductor having a main tripping-coil responsive to overload in that conductor, an auxiliary tripping-coil for each circuit-breaker, and means responsive to the tripping of any one circuit-breaker for energizing the auxiliary tripping-coils of all the circuit-breakers.

5. The combination of a plurality of conductors of the same system maintained at different potentials, a circuit-breaker in series with each of a plurality of said conductors, a main tripping-coil and an auxiliary tripping-coil for each circuit-breaker, and means responsive to the tripping of any one circuit-breaker for energizing the auxiliary tripping-coils of all the circuit-breakers.

In witness whereof I have hereunto set my hand this 28th day of September, 1901.

CHARLES W. STONE.

Witnesses:
　EDWARD WILLIAMS, Jr.,
　HELEN ORFORD.